Sept. 7, 1926.
S. M. KASS
1,599,277
CLAMP FOR PIPE REPAIR
Filed Oct. 2, 1924
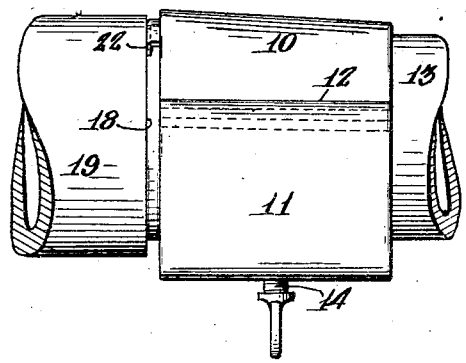
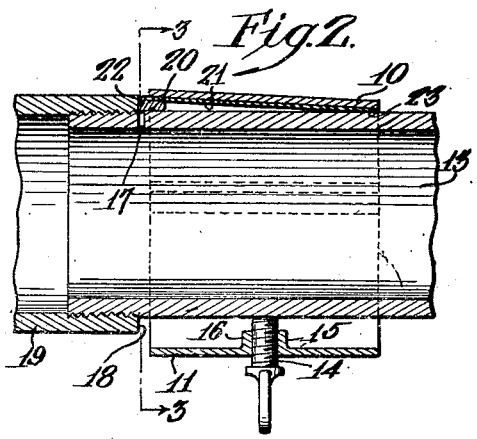
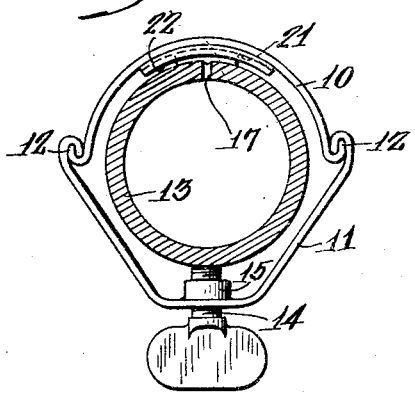
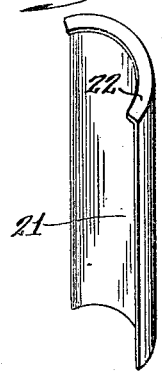
Inventor.
Samuel M. Kass.
Witness:
Walter Chism.
by
Attorney.

Patented Sept. 7, 1926.

1,599,277

UNITED STATES PATENT OFFICE.

SAMUEL M. KASS, OF PHILADELPHIA, PENNSYLVANIA.

CLAMP FOR PIPE REPAIR.

Application filed October 2, 1924. Serial No. 741,209.

My invention relates to pipe repair clamps and to an adjunct for use with pipe repair clamps adapting them to stop leaks at shoulders, as at the ends of sleeves and other fittings.

A purpose of my invention is to concentrate the pressure of a pipe repair clamp over a leak at one side of the clamp by inserting within the clamp an arcuate plate having an interior flange at one end which is applied above the leak.

Further purposes will appear in the specification and in the claims.

I have illustrated my invention by but one form, selecting a form which has proved to be practical, efficient and very inexpensive and which at the same time well illustrates the principles of my invention.

Figure 1 is a side elevation showing my repair clamp stopping a pipe leak at the end of a sleeve.

Figure 2 is a section of Figure 1 in the plane of the paper.

Figure 3 is a section of Figure 2 taken upon the line 3—3.

Figure 4 is a perspective view of the arcuate plate used to concentrate the pressure of the clamp above the leak at the end of the fitting.

In the drawings similar numerals indicate like parts.

Describing in illustration and not in limitation and referring to the drawings,—

Primarily the object of my invention is both to provide a construction by which the use of sheet metal is made more economical and effective and to provide means for concentrating the clamp pressure alternatively at the middle or at either end of the clamp.

A preferred general form of clamp is of the type disclosed and described in my U. S. Letters Patent No. 1,487,337, dated March 18, 1924.

Cooperating clamp members 10 and 11 have longitudinal clincher joints 12 and together completely surround the pipe 13. A screw 14 fits the thread of a nut 15 located inside the member 11 and engages one side of the pipe, the clamping action being between the other side of the pipe and the member 10.

The nut 15 is integral with the member 11 and is so constructed by piercing the clamp at this point and swaging or drawing it into a tubular boss which is subsequently tapped to receive the screw 14.

Having the nut inside rather than outside the member 11 gives a neater appearance, making the clamp more marketable and causes the nut to be pressed toward member 11, as distinguished from away from it.

Clamps of this type has hitherto been effective when there was room to place the clamp so that its screw was substantially opposite the leak as is true of the present clamp without the use of the adjunctive plate but very much less effective with leaks at the ends of couplings, T's or other screw fittings, the shoulder of the adjacent fitting then preventing the clamp from properly applying pressure over the leak.

I have discovered that leaks at the ends of fittings may be stopped by the use of the same clamp in combination with an adjunctive or supplemental plate, arcuate in cross section and having an interior flange at one end.

In the illustration, the leak 17 adjacent the shoulder 18 of the fitting 19 is covered with usual packing 20, and the arcuate plate 21 is placed with its inwardly directed flange 22 pressing into the packing just above the leak, effectively closing the leak. The plate 21 is pressed to place by the screw clamp, the reaction of the pipe against the clamp member 10 being exerted on the face of the flange 22 and on the end 23 of the plate 21. As a result of this concentration of pressure upon the flange 22 above the leak, the packing is compressed into the leak with great intensity.

Normally the arcuate plate is not used unless the leak is located near a shoulder making it difficult or impossible to use the clamp in the usual way, and as the flange may be placed at either end of the clamp (or the clamp itself reversed end for end) the combination of plate and clamp permits alternatively concentrating the compression at the middle or at either end of the clamp.

Because of the tilting of the plate by the packing a longitudinal component of the swinging plate movement forces the packing toward the shoulder of the fitting.

In view of my invention and disclosure variations and modifications to meet individual whim or particular need will doubtless become evident to others skilled in the art, and I therefore claim all such in so far as they fall within the reasonable spirit and scope of the invention.

Having thus described my invention, what I claim as new and desire to secure by Letters Patent is:—

1. A pipe repair clamp adapted to surround the pipe and separable to permit removal therefrom, in combination with an arcuate plate within the clamp, having an internal flange at one end of the plate and adapted to be tightened against the pipe by the clamp.

2. In a pipe repair clamp, two sheet metal clamp members united by clincher joints and together surrounding the pipe, a nut located inside one of the members and integral therewith, a screw threading the nut to engage the pipe and tighten the clamp, in combination with an arcuate plate located inside the other of said members and having an interior flange at one end.

SAMUEL M. KASS.